May 14, 1929.  E. A. KAESTNER ET AL  1,712,733
MILK HOLDER
Filed Oct. 2, 1926  5 Sheets-Sheet 1

Inventors
E. A. Kaestner
R. E. Kaestner
by Hubert E. Peck
Attorney.

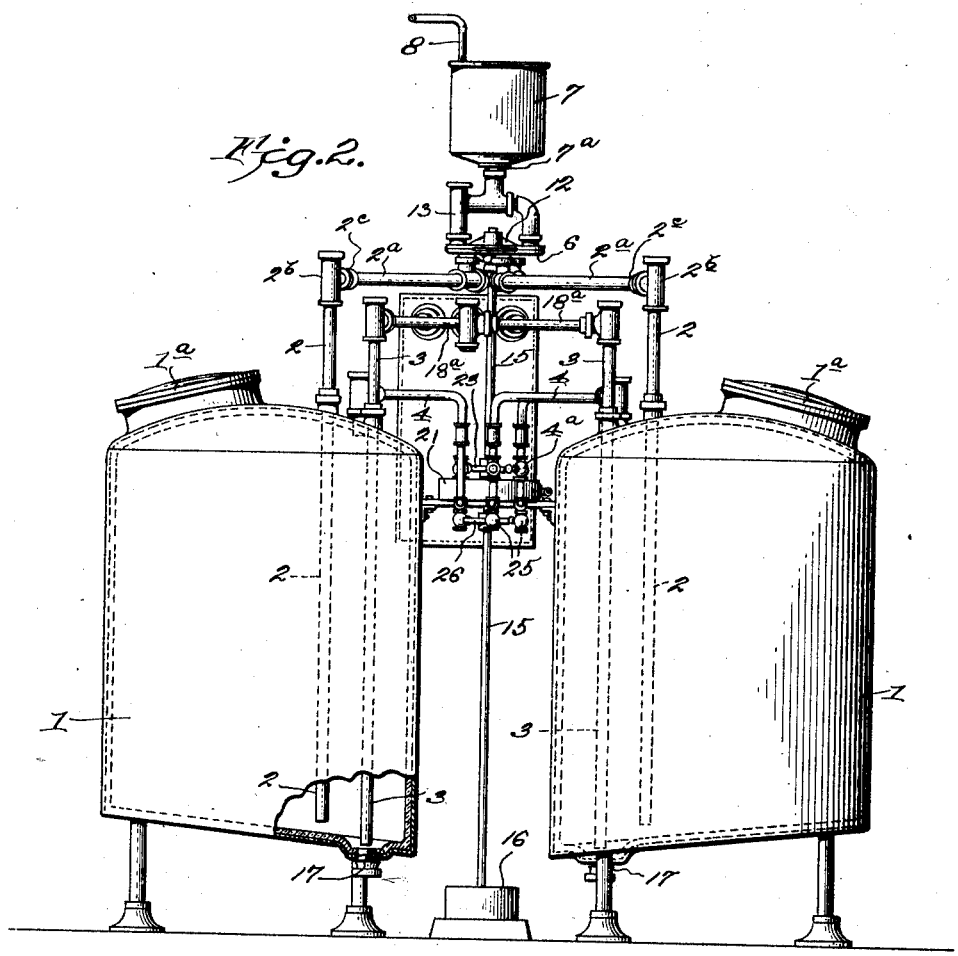
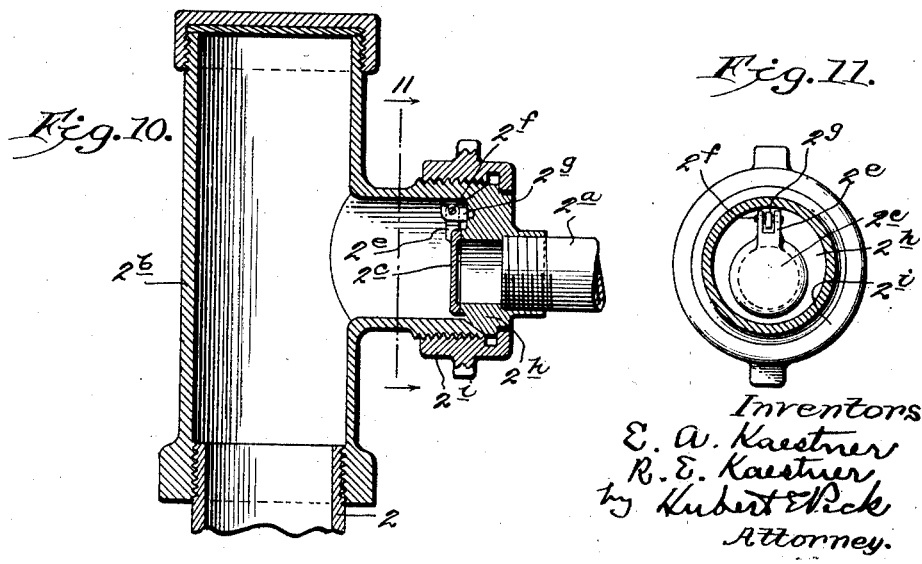

May 14, 1929.  E. A. KAESTNER ET AL  1,712,733
MILK HOLDER
Filed Oct. 2, 1926  5 Sheets-Sheet 3

Inventors
E. A. Kaestner
R. E. Kaestner
by Hubert E. Peck
Attorney.

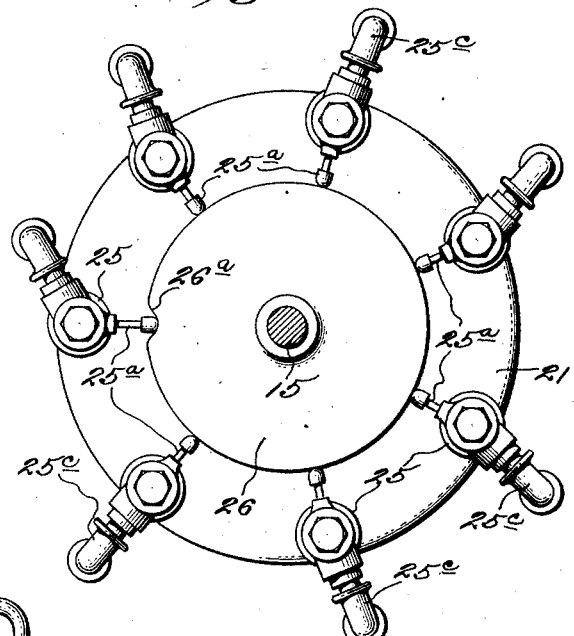
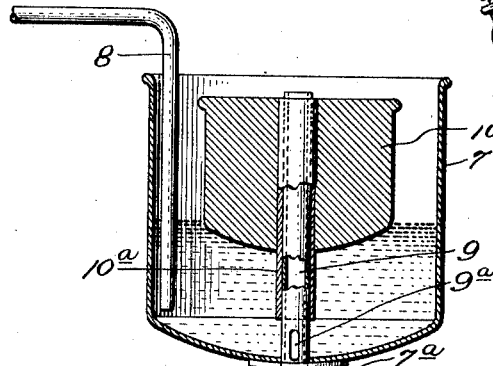
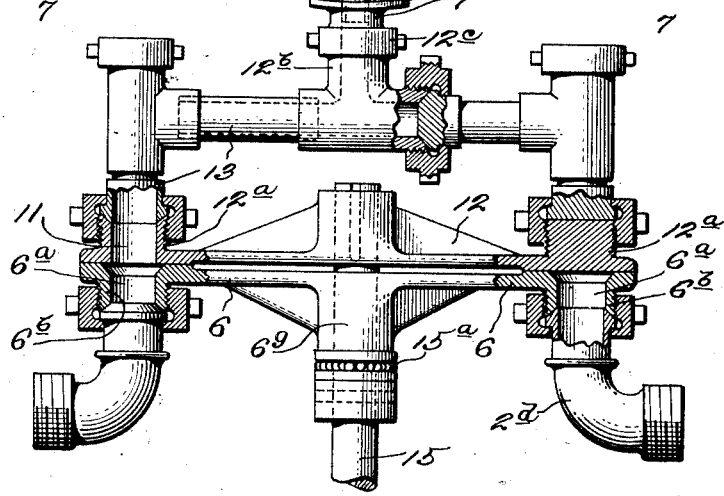

May 14, 1929.  E. A. KAESTNER ET AL  1,712,733
MILK HOLDER
Filed Oct. 2, 1926  5 Sheets-Sheet 5

Inventors,
E. A. Kaestner
R. E. Kaestner
by Hubert E. Necker
Atty

Patented May 14, 1929.

1,712,733

UNITED STATES PATENT OFFICE.

ERNEST A. KAESTNER AND ROBERT E. KAESTNER, OF BALTIMORE, MARYLAND, ASSIGNORS TO J. G. KAESTNER, OF BALTIMORE, MARYLAND.

MILK HOLDER.

Application filed October 2, 1926. Serial No. 139,217.

This invention relates to certain improvements in milk holders employed in connection with or forming a part of pasteurizing apparatus, and the objects and nature of the invention will be readily understood by those skilled in the art in the light of the following explanations of the accompanying drawings that illustrate what we now believe to be the preferred mechanical expression or embodiment from among other forms, constructions and arrangements within the spirit and scope of our invention and this case is in part a continuation of our application filed October 1, 1925, Ser. No. 59,976, for patent for pasteurizing apparatus and method.

An object of the invention is to provide improved means whereby the milk is distributed to the separate receptacles or individual holders; and a further object is to improve the means whereby the fluid for blowing or driving the milk from the holders successively is distributed and whereby said individual receptacles are vented during the filling or loading of such receptacles successively; and a further object is to improve the milk supply from which the milk is distributed to the individual holders or receptacles.

With these and other objects in view our invention consists in certain novel arrangements, features, constructions or combinations, as more fully and particularly set forth and specified hereinafter.

Referring to the accompanying drawings forming a part hereof:—

Fig. 2 is an end elevation partly in vertical section, more or less diagrammatical, with parts broken away.

Fig. 5 is a detail cross section bottom view on the line 5—5, Fig. 3.

Fig. 6 is a detail sectional elevation of the assembly, in part for distributing the milk to the receptacles of the holder, in succession.

Fig. 10 is a detail vertical section, on an enlarged scale, of a filling pipe connection to show the check valve therein.

Fig. 11 is a detail section on the line 11—11, Fig. 10.

Figure 1:
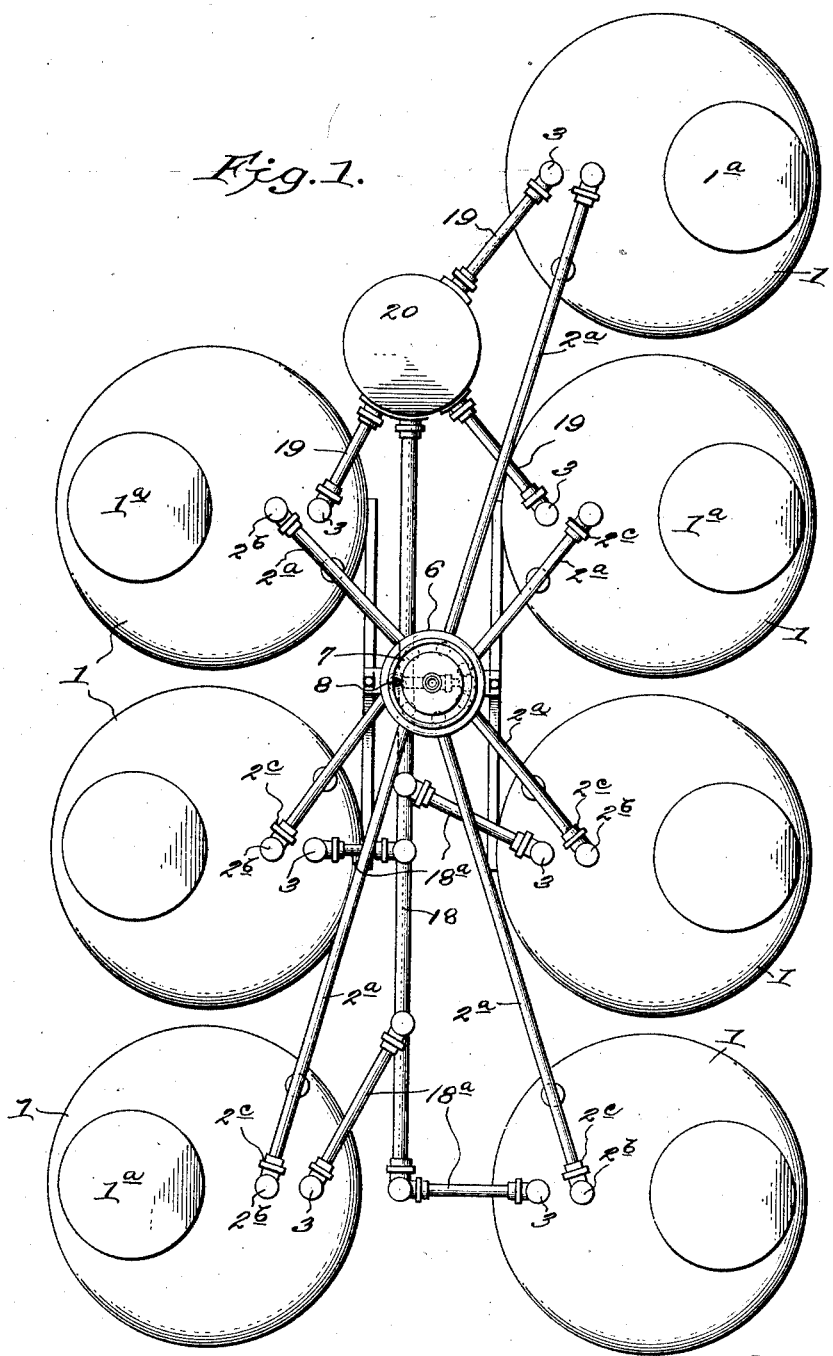
Fig. 1 illustrates in top plan the milk holder portion, of a pasteurizing apparatus, embodying our invention.
Figure 3:
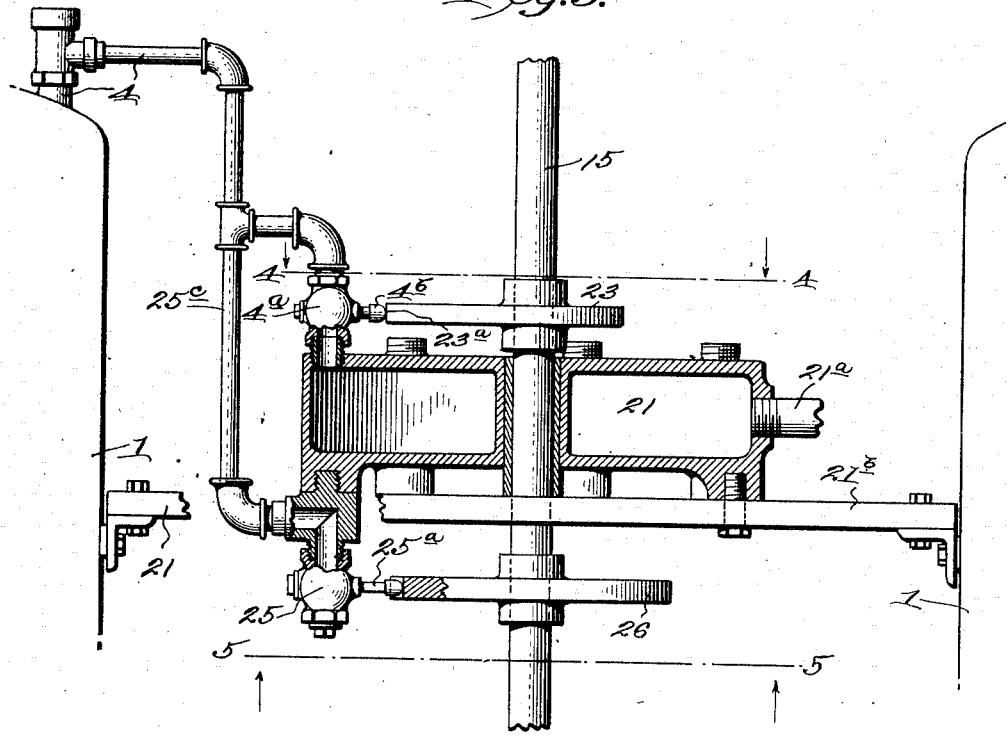
Fig. 3 is a detail elevation partially broken away of the pressure air box, and parts adjacent thereto.
Figure 4:
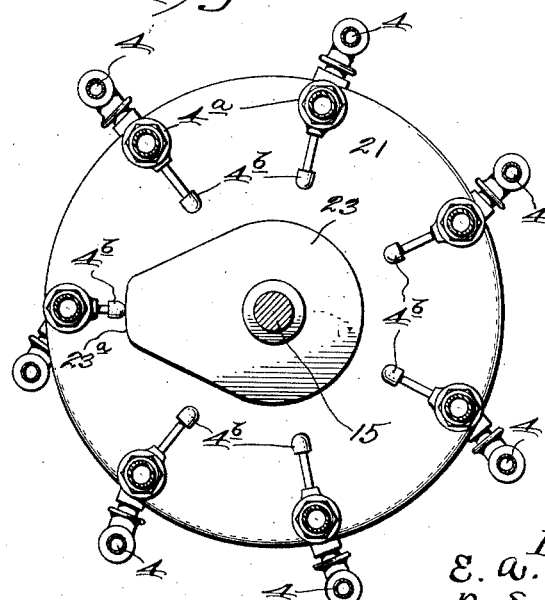
Fig. 4 is a detail cross section on the line 4—4, Fig. 3.
Figure 7:
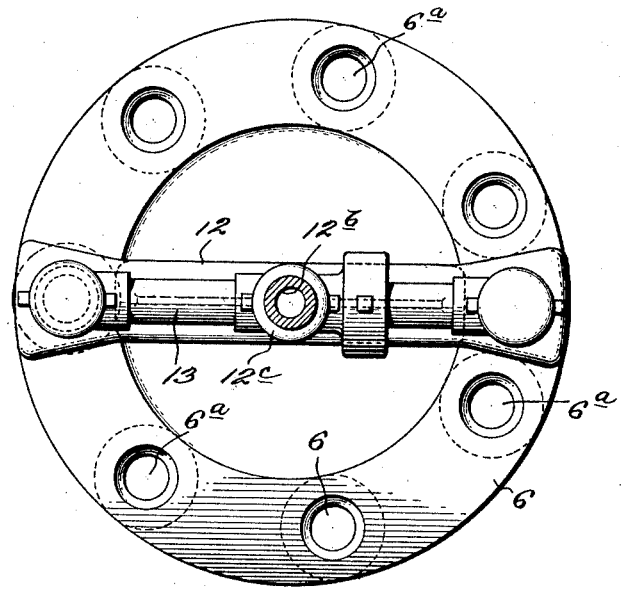
Fig. 7 is a detail sectional top plan showing the valve plate and the rotary cross head thereon.
Figure 8:
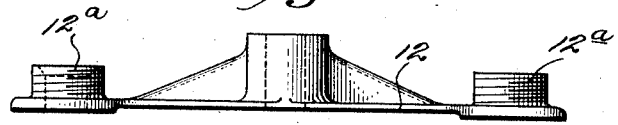
Fig. 8 is a detail side elevation of the liquid distributing rotary cross head.
Figure 9:
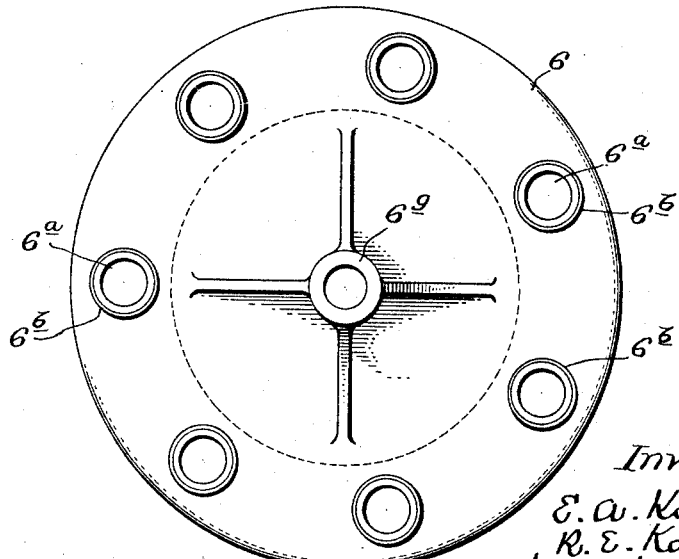
Fig. 9 is a detail bottom plan of the fixed distributing plate.

The apparatus disclosed provides a holder embodying a number of holding receptacles or containers 1, that are successively filled with the hot liquid (such as milk) from the pasteurizer or heater. The liquid is held in each receptacle for the required length of time and within the temperature limits to complete the pasteurization process, as is well understood by those skilled in the art. The pasteurized liquid is blown from the receptacles in succession, when each body of liquid has remained in its holding receptacle for the required length of time.

It is within the spirit and scope of our invention to provide the separate holding receptacles of the holder in any suitable or desirable arrangement or manner, whether by individually complete tanks or by divisions or compartments of one large tank, or otherwise.

In the particular example illustrated, we show a group of seven individually complete, approximately similar upright closed tanks 1, constituting the holding receptacles, although the arrangement of receptacles can be varied, and of course the number of receptacles can be increased or diminished to suit the requirements of the particular installation.

In the example shown, each receptacle 1, consists of a tank that is normally closed approximately air tight, except for an air release vent, hereinafter described, and that is provided with a top, or otherwise located, hand hole or other opening that is normally tightly closed by cover 1ª, and with a filling pipe 2; a discharge pipe 3; and a pipe 4, to supply the tank emptying fluid, and in this particular example, this pipe 4, also provides an air release or vent for escape of air while milk is being discharged into the receptacle.

In accordance with common practice and knowledge, where foaming is objectionable, the outlet of the filling pipe 2, is located at the bottom portion of the interior of the holding receptacle to fill the same from the bottom up. In the example shown, the filling pipe embodies a straight vertical pipe section that rises from and extends down through the top of the receptacle and approximately throughout the length of the receptacle interior. The projecting upper end of said vertical length of pipe 2, is provided with a lateral or approximately horizontally extending pipe length extension $2^a$, normally fixed to the upper end of said vertical length through the medium of angle union or coupling $2^b$. The filling pipe connection, preferably above the holding receptacle is equipped with an inwardly opening check valve $2^c$, to permit free or gravity flow of liquid to the receptacle but to close the pipe connection against back flow or escape of pressure from the receptacle.

All of the holding receptacles 1, of the group are equipped with such check valve controlled filling pipe connections that have normally fixed or rigid lateral pipe extensions $2^a$.

These lateral pipe extensions are all joined to a stationary common horizontally disposed normally-fixed distributing or valve disk or plate 6. This plate 6, is formed with a circular series of uniformly-spaced vertical ports $6^a$, extending through the plate and open at their upper ends, one for each filling pipe connection $2^a$, and forming the inlets for the filling pipe connections, respectively. The filling pipe connections are at their outer ends coupled to the plate 6, in downward continuation of the ports $6^a$, respectively. For instance, in the example illustrated, the plate 6, is formed with depending externally threaded tubular nipples $6^b$, in downward continuation of the ports $6^a$, respectively, and each lateral pipe length $2^a$, is, at its outer or inlet end, fitted with a pipe elbow or coupling $2^d$, the upstanding ends of which are coupled to the depending nipples $6^b$, respectively.

Means is provided above said valve plate 6, to advance step by step around the circle of vertical ports $6^a$, to fill the holding receptacles one by one by gravity flow through said ports in succession. For instance, we show a rotary hot liquid distributer arranged above the plate 6, and arranged to be rotated step by step on a vertical axis concentric with the axis of the circle of ports $6^a$. This distributer embodies an elevated vertical hot liquid supply and distributing tank or vessel 7, into which the hot liquid is supplied from the pasteurizer through pipe 8, that depends into the lower portion of vessel 7, to a point below the approximately maintained liquid level in said vessel, so that the hot liquid outlet of pipe 8, is always submerged in the body of liquid in said vessel 7, to avoid foaming. The supply and distributing vessel has a vertical central gravity discharge bottom outlet through a depending exteriorly threaded nipple $7^a$, rigid with the bottom of the vessel.

Suitable means is provided to maintain in vessel 7, the desired minimum body of hot liquid or an approximately minimum liquid level. For instance, for this purpose we provide a float controlled valve to close the gravity flow liquid outlet from vessel 7, when the liquid drops to or approximately to the established minimum level, and thus stop the liquid discharge from the vessel until the liquid inflowing through pipe 8, again elevates the float to open the vessel discharge or outlet, which is normally open during the operation of the apparatus. In the specific example illustrated, a fixed vertical discharge pipe 9 rises in the vessel from the floor in upward continuation of the discharge nipple $7^a$, so that the bottom outlet from the vessel is closed except to liquid flow through said pipe. The pipe is formed with one or more side inlet openings $9^a$, from the lower portion of the vessel. The float 10, is confined in the vessel to vertical movement on the pipe 9. The float has a vertical guideway receiving said pipe and a depending valve or cut off tube $10^a$, freely vertically slidable on with a running fit and surrounding the pipe to close and open the ports $9^a$, as the float drops and elevates with the liquid in vessel 7. The elevated supply vessel 7, is carried by and normally fixed to a supporting structure that rises from and rests on the top face of plate 6 with a sliding running fit and that provides a gravity flow passage leading down from the vessel outlet nipple $7^a$, to a vertical downwardly opening liquid discharge port 11, that is brought into registration with the inlet ports $6^a$, in succession, as the supporting structure rotates on an axis concentric with the circle of said inlet ports, for the free gravity flow of liquid from elevated vessel 7, into the holding receptacles in succession. The imperforate flat top face portions of the plate 6 intervening between the inlets $6^a$, serve to cut off the down flow of liquid through discharge port 11, and close said port, when the port is traveling between the inlets, i. e. from inlet to inlet.

The supporting structure rising from and slidable on the top face of plate 6, and that carries the elevated vessel 7, can be variously formed and constructed, although in the specific example illustrated, said structure embodies a bottom plate or diametrical cross head 12, the flat bottom face of which is parallel with the top face of plate 6 with a running slidable fit. The outlet 11, extends vertically through one end of this cross head and a pipe connection 13, leads from the vessel nipple 7$^a$, to said outlet 11, and this pipe connection is normally rigid and fixed to nipple 7$^a$, and to the cross head 12. This pipe connection 13, is preferably composed of separable straight pipe lengths, T-pipe unions and couplings to permit detachment of the sections for cleansing and sterilization. In the example shown, the portion of the supporting frame for the vessel 7, that upstands from the cross head 12, is of normally rigid depending forked or yoke formation, at its lower ends, secured by threaded couplings to threaded nipples or bosses 12$^a$, upstanding from the ends of cross head 12, and at its straight top cross portion having a hollow upstanding nipple 12$^b$, secured to nipple 7$^a$, by coupling 12$^c$, with bore of nipple 12$^b$, in downward continuation of the discharge outlet through nipple 7$^a$.

The top face of the annular portion of plate 6, that includes the circular series of inlet ports 6$^a$, is preferably ground or finished to provide a flat smooth face, and the same is true of the bottom surface of the portion of the cross head that fits and slides on said annular portion of plate 6, to provide a running joint or fit without objectionable milk leakage, particularly as the liquid falling by gravity from or resting in outlet 11, is not under pressure.

The elevated vessel 7, through its supporting frame 12, 13, is rotated forward step by step and is timed in its advancing movements and periods of rest, by vertical rotary shaft 15. This shaft is actuated and timed by any suitable actuating and timing mechanism, diagrammatically indicated by the box or gear case 16.

In the particular embodiment shown, the plate 6, is formed with a depending hub 6$^g$, providing a central vertical bore through the plate 6, providing a bearing for the upper end of shaft 15, in which said shaft freely rotates, while the upper extremity of the shaft projects above plate 6, and enters and is keyed or fixed to the center of the cross head 12, to rotate the same. The plate 6, supports the elevated vessel 7, and the supporting structure 12, 13, and to brace the plate, we usually provide a thrust bearing 15$^a$, between a collar fixed on the shaft and the lower end of hub 6$^g$, of the plate.

The pipe connections and liquid passages from the elevated vessel 7, to the bottoms of the holding receptacles, are all preferably arranged and inclined to drain toward the bottom outlets of pipes 2, and said pipe connections and liquid passages are preferably normally tight against liquid leakage from and outside air leakage thereinto, and the pipe lengths and parts of said pipe connections are preferably detachable and separable so as to be capable of cleaning and sterilization.

In the example illustrated, the straight discharge pipe length 3, of each holding receptacle extends down through the top wall of the receptacle with its inner end at approximately the lowest portion of the receptacle bottom, as into a slight well or depression in the receptacle bottom, said well having a drain or cleanout hole normally tightly closed by cap 17. The upper ends of discharge pipes 3, of the receptacles extend above the top walls of the receptacles and suitable lateral pipe connections 18$^a$, extend therefrom by manifold 18 or by direct pipe connection 19, to a common collecting tank 20, from which the pasteurized liquid flows in a continuous stream to the regenerator or cooler (not shown). The pipe connections from the discharge pipes 3, are preferably all arranged to drain toward the common collecting tank 20, and said pipe connections and manifold and the pipe joints and angles included therein are preferably detachable and separable for cleansing and/or sterilization. The pipe lengths 2 and 3 that depend in the holding receptacles, are also preferably removable or otherwise accessible for cleansing and sterilization.

The blower or compressed air pipes 4, extend from a compressed air distributing box 21, to the respective holding receptacles and open into the same above the levels to which said receptacles are filled. In the example shown, the compressed air box is annular or formed with a closed tubular wall extending centrally and vertically therethrough for the passage of the rotary timing shaft 15, that controls the filling and discharge of the receptacles. The compressed air pipes 4, have vertical portions that enter the box 21, through the top wall thereof and these vertical portions of the pipes 4, are uniformly spaced in a circular series around shaft 15 as a center, and each vertical pipe portion is equipped with a valve 4$^a$, normally held in closed position shutting off the passage of compressed air from the box 21 to the holding receptacles. The valves can be spring pressed or otherwise to normally maintain them in and to return them to position closing pipes 4. These separate and independent valves 4$^a$, are formed with exterior reciprocatory or push stems 4$^b$, by which the valves can be independently moved to and held in opened position. These valve stems are arranged in a circle surrounding a rotary cam 23 fixed on and rotating with shaft 15, and having a high operating peripheral portion 23ª, arranged to successively engage and depress the valve stems and hold each depressed stem with its valve opened for the required length of time while one holding receptacle is being emptied and another receptacle is being filled. While the cam holds one valve open to empty the receptacle thereof by the flow of compressed air from box 21, the remaining valves 4ª, remain closed.

Filtered washed air under pressure is supplied to box 21, through pipe 21ª, to constantly maintain the required holding receptacle discharging pressure and supply in box 21.

In the example shown, the box 21, is carried by a suitable bracket 21ᵇ, fixed to one or more adjacent holding receptacles 1.

To provide for venting the holding receptacles during the operation of filling the same, and for closing the vents during the operation of discharging the receptacles, we provide a circular series of uniformly spaced air relief or vent valves 25, fixed to and depending from the box 21 concentric with the shaft 15. These valves are preferably under spring tension to remain in and return to closed position, and each valve is provided with an exterior opening stem 25ª, bearing inwardly against the working or peripheral edge of a rotary cam 26, fixed on the shaft 15, and formed with a low edge portion 26ª. The cam is arranged to hold all of the valves 25 open, except the valve whose stem is in the depression 26ª, which valve is held closed to prevent air or pressure escape from the holding receptacle being discharged by compressed air from box 21. When the cam 23 opens a valve 4ª, to discharge a receptacle, the cam 26 closes the vent or air relief valve of that receptacle, and the receptacles in succession are subjected to this action.

The inlet ducts in the casings of valves 25, are coupled to the pipes 4, respectively, intermediate the receptacles 1 and the compressed air inlet valves 4ª, by pipes 25ᶜ, to avoid the necessity of separate air relief or vent pipes into each receptacle.

The apparatus operates to successively charge the holding receptacles with the hot liquid from the pasteurizer, and the operating mechanism 16, is so timed that when the filling means has completed filling the receptacles of the series, the first filled receptacles will be ready for discharging or emptying, and hence, in the example illustrated, the apparatus is arranged and set to cause discharge of the next receptacle of the series in advance of the receptacle being filled, so that whenever a receptacle is being filled the next receptacle in advance is being discharged, during which operation the compressed air valve 4ª, of said receptacle is held open by cam 23 (the remaining compressed air valves 4ª being closed), and the air release valve 25 of said receptacle is closed (the remaining air release valves 25 being open).

The single receptacle distributing or filling port 11, progresses successively into registration with the inlet ports 6ª, to the holding receptacles, and said filling port 11, is progressed along its annular path of movement step by step by shaft 15, and the cams 23 and 26, are also advanced step by step by said shaft 15, and are set with relation to the port 11, to move one step in advance of said port 11, with relation to the receptacles of the series to cause discharge of the receptacle one step in advance of the receptacle to be filled.

Advantages are gained by automatically maintaining a head or substantial body of hot liquid, such as milk, in the distributing supply vessel 7, in which the outlet from supply pipe 8, is always submerged, particularly as the possibility of foaming is reduced to the minimum, and also the possibility of outside air being sucked or drawn down into the liquid supplying pipe connections from the vessel 7, to the receptacles 1, by the down flowing liquid through pipe 9, or nipple 7ª, is prevented by the constantly maintained body of liquid in vessel 7, in which the vessel bottom outlet is submerged.

The vessel 7 and its supporting structure 12, 13, that rotates therewith, is supported by distributing plate 6, and the distributing plate is supported in whole or in part by the lateral pipe connections 2ª, or in whole or in part by the thrust bearing 15ª, and the thrust collar thereof fixed on the timing shaft 15.

Figs. 10 and 11, show in detail, the peculiar inwardly opening check valve 2ᶜ, that we have designed to meet certain conditions peculiar to apparatus for handling milk and other liquid that must be maintained under sanitary conditions. In the example shown, the check valve embodies a hanging gravity disk 2ᶜ, removably and pivotally hung from an elevated support so that when the pipe connections, unions, etc., are separated for cleansing and sterilization, the check valve disk can also be removed and sterilized, thereby also freeing milk passages controlled thereby, for sterilization. In the form shown, the valve disk is formed with an upstanding forked arm or hanger 2ᵉ, carrying cross or pivot pin 2ᶠ, to removably rest in an open top transverse groove in the upper edge of fixed valve disk supporting arm or bracket 2ᵍ. When the pipe connection parts are separated, the valve with its hanger and pin can be lifted and detached from the supporting arm and can be as readily applied thereto in operative position. The supporting arm 2ᵍ, is fixed to and projects laterally from the inner end face of the check valve casing or body 2ʰ, above the liquid bore and passage through said casing. This casing 2ʰ, is secured to the end of pipe section 2ª, and is formed with a surrounding annular beveled seat that fits the side inlet of the T union 2ᵇ, and is removably secured thereto by coupling sleeve 2ⁱ.

It is evident that various changes, modifications, variations, additions and omissions, might be resorted to without departing from the spirit and scope of our invention, and hence we do not wish to limit our invention to the approximate exact disclosures hereof.

What we claim is:

1. A milk holder and the like, comprising a series of closed holder tanks each provided with a vent normally open to atmosphere; each of said holder tanks provided with a check valve controlled gravity flow filling pipe discharging into the bottom part thereof, and each provided with an upstanding interiorly unobstructed discharge pipe separate from the filling pipe and having its inlet located in the bottom of the tank, and each provided with a pressure fluid supply pipe opening thereinto above the tank liquid level for supplying tank emptying fluid under pressure; filling mechanism to charge said tanks in succession through their said filling pipes with hot gravity flowing liquid from a pasteurizer, said mechanism embodying means to prevent inrush of air into the means and filling pipes with the gravity flowing hot liquid; means for temporarily supplying the pressure fluid supply pipes of charged tanks wherein the hot liquid has been held for the required time, in succession, with tank discharging fluid under pressure to empty said charged tanks in succession through their respective discharge pipes; means for temporarily closing the vents of the tanks in succession while each tank is being emptied by discharge thereinto of said fluid under pressure; and timing and actuating mechanism, whereby said tanks are in succession charged with hot liquid at atmospheric pressure and whereby the hot liquid is held in each tank at atmospheric pressure for the required length of time and whereby the charged tanks are then emptied in succession by admission of fluid under pressure while the other tanks remain under atmospheric pressure and the emptied tanks are being filled in succession.

2. A milk holder and the like for continuous gravity inflow of hot milk from the pasteurizer at atmospheric pressure and for continuous outflow of held milk under pressure; comprising a series of closed holder tanks normally open to atmospheric pressure; a receptacle common to and in constant open communication with all of said tanks to receive the held milk discharged therefrom through the medium of valveless discharge pipes from the lowest portions of the interiors of the tanks, respectively; check-valve-controlled filling pipes extending into said tanks for gravity flow of hot milk thereinto; a source of hot milk to be discharged by gravity into said tanks for holding; distributing means movable to charge said tanks with gravity flowing milk from said source through said filling pipes in succession while cutting off the remaining tanks from the milk from said source; means for temporarily discharging fluid under tank emptying pressure into the charged tanks in succession while cutting off said pressure fluid from the remaining tanks; means whereby each tank is temporarily closed to the atmosphere while being emptied by said pressure fluid and the remaining tanks are opened to the atmosphere; and timing and actuating mechanism.

3. Pasteurizing apparatus, comprising a series of liquid pasteurizing closed holders, each having a filling pipe, means for charging said holders through the filling pipes with liquid to be pasteurized, means for permitting air escape from said holders, each holder provided with a pasteurized liquid upstanding separate discharge pipe, means being provided for closing each holder against pressure escape except through its said discharge, means for introducing compressed air into each holder for driving the pasteurized liquid therefrom through said discharge, rotary distributing means controlling the charging operations, a rotary cam controlling the closing of the holders against pressure escape, a rotary cam controlling the compressed air discharge into the holders, and timing and actuating means.

4. A milk holder and the like, comprising a series of closed holder tanks each provided with a vent normally open to atmosphere; each of said holder tanks provided with a check valve controlled filling pipe, and each provided with an upstanding interiorly unobstructed discharge pipe having its inlet located in the bottom of the tank, and each provided with a pressure fluid supply pipe opening thereinto above the tank liquid level for supplying tank emptying fluid under pressure; filling mechanism to charge said tanks in succession through their said filling pipes with liquid from a pasteurizer; means for temporarily supplying the pressure fluid supply pipes of charged tanks wherein the hot liquid has been held for the required time, with tank discharging fluid under pressure to empty said charged tanks in succession through their respective discharge pipes; means for temporarily closing the vents of the tanks in succession while each tank is being emptied by discharge thereinto of said fluid under pressure; and timing and actuating mechanism, whereby said tanks are in succession charged with hot liquid and whereby the hot liquid is held in each tank for the required length of time and whereby the charged tanks are then emptied in succession by admission of fluid under pressure while the emptied tanks are being filled in succession.

5. A milk holder and the like for continuous inflow of hot milk from the pasteurizer at atmospheric pressure and for continuous outflow of held milk under pressure; comprising a series of closed holder tanks normally open to atmospheric pressure; a receptacle common to and in constant open communication with all of said tanks to receive the held milk discharged therefrom through the medium of valveless discharge pipes from the lowest portions of the interiors of the tanks, respectively; filling pipes extending into said tanks for flow of hot milk thereinto; a source of hot milk to be flowed into said tanks for holding; distributing means movable to charge said tanks with milk from said source through said filling pipes in succession while cutting off the remaining tanks from the milk from said source; means for temporarily discharging fluid under tank emptying pressure into the charged tanks in succession while cutting off said pressure fluid from the remaining tanks; means whereby each tank is temporarily closed to the atmosphere while being emptied by said pressure fluid and the remaining tanks are opened to the atmosphere; and timing and actuating mechanism.

6. A milk holder and the like, comprising a series of closed holder tanks each provided with a vent to atmosphere, and with an upstanding interiorly unobstructed discharge pipe having its inlet located in the bottom of the tank, and with a pressure fluid supply pipe opening thereinto above the tank liquid level for supplying tank emptying fluid under pressure; filling mechanism to charge said tanks in succession with liquid from a pasteurizer; means for temporarily supplying the pressure fluid supply pipes of charged tanks wherein the hot liquid has been held for the required time, with tank discharging fluid under pressure to empty said charged tanks in succession through their respective discharge pipes; means for temporarily closing the vents of the tanks in succession while each tank is being emptied by discharge thereinto of said fluid under pressure; and timing and actuating mechanism, whereby said tanks are in succession charged with hot liquid and whereby the hot liquid is held in each tank for the required length of time and whereby the charged tanks are then emptied in succession by admission of fluid under pressure while the emptied tanks are being filled in succession.

7. A milk holder comprising a series of closed holder tanks, each provided with an open or valveless upstanding discharge pipe having its inlet in the lowest portion of the tank and also with a supply pipe opening into the tank above its liquid level to discharge into the tank fluid under pressure to empty the tank by raising its liquid contents through said discharge pipe; a vessel common to said tanks and into which the discharge pipes thereof empty; a supply receptacle for fluid under pressure; rotating means for establishing fluid pressure communication from said supply receptacle to said supply pipes one at a time while the remaining supply pipes are cut off from said fluid pressure receptacle; means whereby each tank being emptied is closed against pressure release except through its said discharge pipe; said tanks being open to atmospheric pressure except the tank being emptied; gravity flow filling pipes leading to said holder tanks for charging the same with the hot liquid to be held by gravity flow thereinto; a rotary distributer controlling the gravity flow of the hot liquid to said filling pipes to cause charging of the holders one by one; and timing and actuating mechanism.

8. A milk holder comprising a series of holder tanks each having a filling pipe and a separate discharge pipe; a source of hot milk supply; distributing mechanism for distributing the milk from said supply to said filling pipes to charge said tanks one by one, said mechanism embodying means to prevent inrush of air into the down flowing milk from said source to said filling pipes, and rotating means to cut off all of the filling pipes from said source except the filling pipe of the tank being charged and to charge said tanks in succession; rotating means controlling the discharge of the hot held liquid from said tanks in succession; and timing and actuating mechanism for said several rotating means.

9. A milk holder comprising a series of closed holder tanks, each provided with an open or valveless upstanding discharge pipe having its inlet in the lowest portion of the tank and also with a supply pipe opening into the tank above its liquid level to discharge into the tank fluid under pressure to empty the tank by raising its liquid contents in and discharging the same through said discharge pipe; a supply receptacle for fluid under pressure; rotating means for establishing fluid pressure communication from said supply receptacle to said supply pipes one at a time while the remaining supply pipes are cut off from said fluid pressure receptacle; means whereby each tank being emptied is closed against pressure release except through its said discharge pipe; distributing and filling mechanism for successively charging said tanks with the hot liquid to be held; and timing and actuating mechanism whereby the hot liquid charge in each tank of the series is held for the required length of time and then discharged while the previously emptied tank is being charged.

10. A milk holder comprising a series of holding receptacles, each provided with a filling pipe having a lateral supply pipe connection, a horizontal plate common to said connections and to which said connections are secured at their inner ends, said plate having a circular series of vertical ports open through the plate top and forming the inlets of said pipe connections, respectively, and a hot liquid supply and distributing mechanism common to all of said inlets and embodying a member the under face of which has sliding running fit with the top face of said plate, said member having a vertical liquid outlet from the liquid supply for registration with said ports one at a time for successively filling said receptacles, and timing and actuating means, said mechanism embodying a liquid supply vessel with a central vertical outlet, and a rotary cross head supporting frame therefor that includes said member and a downwardly extending liquid passage from the vessel outlet to said vertical outlet of said member, said timing and actuating means embodying a vertical rotary timing shaft for rotating said supporting frame.

11. A milk holder and the like, comprising a series of holding receptacles, a horizontal distributing plate common to said receptacles and having a circular series of spaced inlet ports opening through the top face of the plate, said ports connected to said receptacles, respectively, for delivering the hot milk thereto, a horizontal cross head resting on the top face of said plate with a running sliding fit and rotatable on a vertical axis concentric with said ports, said cross head having a vertical outlet for successive registration with said ports, an elevated hot liquid supply vessel having a central vertical bottom outlet, means carried by said cross head and providing a gravity flow liquid passage from the vertical outlet of the vessel down to said vertical outlet of the cross head, and a timing and actuating rotary shaft for rotating said cross head.

12. A milk holder and the like, comprising a series of holding receptacles, mechanism for successively charging said receptacles with the hot milk to be held, each vessel having a discharge pipe from the bottom portion thereof, discharge means for causing discharge of said receptacles through said discharge pipes, said discharge means embodying a compressed air box, compressed air pipes leading therefrom into the upper portions of said receptacles respectively, valves normally maintaining said pipes closed, a rotary timing shaft having a cam to cause opening of said valves successively, each compressed air pipe having a receptacle venting outlet controlled by a normally open valve, and a cam on said shaft for successively closing said normally open venting valves.

13. A milk holder and the like, comprising a series of holder tanks; means for charging said tanks in succession with the hot liquid to be held therein; means for discharging fluid under pressure, such as compressed air, into the charged tanks one by one to drive the held liquid therefrom; a rotary shaft; timing and actuating mechanism for said shaft; a member rotated by said shaft controlling said means for charging said tanks in succession with the hot liquid to be held; a cam rotated by said shaft and controlling said means for discharging compressed air into the charged tanks; and means for venting and closing said tanks embodying a cam rotated by said shaft.

14. A milk holder and the like, comprising a series of holder tanks for the hot fluid to be held, a rotary shaft; timing and actuating mechanism for said shaft; means controlled and actuated by said shaft for charging said tanks one by one with the hot liquid to be held by the tanks; a compressed air tank; compressed air pipes leading from said air tank to said holder tanks, respectively, for discharging compressed air into the tanks to empty the same by driving the held liquid therefrom; valves for closing and opening said air pipes; means rotated by said shaft and cooperating with said valves for discharging compressed air into said holder tanks one by one while excluding compressed air from the remaining tanks; and means embodying a member rotated by said shaft for temporarily closing the tanks one by one from pressure escape except with the liquid being discharged therefrom by the compressed air, whereby the tank being discharged is thus closed and the remaining tanks are open to pressure escape.

15. Pasteurizing apparatus, embodying a series of liquid pasteurizing holders all having means for venting the same during the charging and holding steps, each holder having a filling pipe closed against outflow and a liquid discharge open to outflow, means for charging said holders one by one through said filling pipes with liquid to be held, means for introducing compressed fluid into said holders one by one to drive the pasteurized liquid therefrom through said open discharge, each holder having means for closing the same against pressure escape except through said liquid discharge when the pasteurized liquid is being driven from the holder whereby the remaining holders are each vented, and means for preventing entrance of compressed fluid to holders being charged and containing liquid under pasteurization.

16. Pasteurizing apparatus, embodying a series of liquid pasteurizing holders normally vented to atmosphere, each holder having a gravity flow liquid supply pipe leading thereinto and an open non-check valve controlled pasteurized liquid discharge, a source of compressed fluid normally cut off from all of said holders except the holder being discharged, means to close each holder being discharged against pressure escape except through its said open discharge, whereby all of the remaining holders are vented to atmosphere, means for automatically discharging compressed fluid from said source into said holders one by one for discharging the same, and means common to all of said holders for causing gravity flow of hot liquid to be pasteurized into said liquid supply pipes of the vented holders one by one while cutting off said flow of liquid into the liquid supply pipes of the remaining holders, and actuating and timing mechanism.

17. In combination, a series of closed holders each provided with a vent normally open to atmosphere; a source of hot liquid to be pasteurized; connections extending to the holders respectively for charging the holders one by one with the liquid to be held including rotary liquid passage means controlling the flow of liquid to the holders respectively, whereby the liquid supply is cut off from all holders except the one being filled; each holder provided with a constantly open pasteurized liquid discharge; a source of fluid under pressure; connections from said source of pressure fluid to the holders respectively; means embodying a rotary member for causing discharge of fluid under pressure into the holders one by one while cutting off the remaining holders therefrom; and means whereby each holder being discharged is closed against pressure escape except through its open liquid discharge.

18. In combination, a series of holders normally vented to atmosphere; a source of hot liquid to be pasteurized; pipe connections leading therefrom to the holders respectively; rotary means controlling the flow of liquid into said pipes, respectively, to charge the holders one by one while cutting off the supply from the remaining holders; each holder having an open pasteurized liquid discharge; means for discharging into the holders one by one fluid under pressure for discharging the holders successively each through its said open discharge and for shutting off the remaining holders from the compressed fluid; and means for closing each holder being discharged against pressure escape except through its discharge, whereby the remaining holders are vented to atmosphere.

19. In combination; a series of pasteurizing holders each provided with an open non-check valve controlled discharge; filling means for charging said holders in succession with the hot liquid to be held; a source of fluid under pressure; valve means including rotary cam mechanism and pressure pipe connections for causing discharge of said fluid under pressure into said holders in succession to discharge each holder through its said open discharge while cutting off the remaining holders from said pressure fluid; and timing and actuating mechanism for said filling means and said cam mechanism.

Signed at Baltimore city, State of Maryland, this 25th day of September, 1926.

ERNEST A. KAESTNER.
ROBERT E. KAESTNER.